(12) United States Patent
Dustin et al.

(10) Patent No.: US 12,116,504 B2
(45) Date of Patent: Oct. 15, 2024

(54) FLUORINATED POLY(IMIDE-PHTHALONITRILE) ADHESIVE FORMULATIONS AND RELATED METHODS

(71) Applicant: The Boeing Company, Chicago, IL (US)

(72) Inventors: Ashley Marie Dustin, Santa Monica, CA (US); Kevin James Drummey, Malibu, CA (US); Phuong Bui, Thousand Oaks, CA (US); Gregory Phillip Nowak, Swansea, IL (US); Andrew P. Nowak, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 266 days.

(21) Appl. No.: 17/829,521

(22) Filed: Jun. 1, 2022

(65) Prior Publication Data
US 2023/0392055 A1  Dec. 7, 2023

(51) Int. Cl.
*C09J 127/24* (2006.01)
*C09J 7/35* (2018.01)
*C09J 179/08* (2006.01)
*C09J 181/06* (2006.01)

(52) U.S. Cl.
CPC .............. *C09J 127/24* (2013.01); *C09J 7/35* (2018.01); *C09J 179/08* (2013.01); *C09J 181/06* (2013.01); *C09J 2203/35* (2020.08)

(58) Field of Classification Search
CPC .................................................. C09J 127/24
USPC ....................................................... 528/210
See application file for complete search history.

(56) References Cited

U.S. PATENT DOCUMENTS

| | | |
|---|---|---|
| 3,890,274 A | 6/1975 | D'Alelio |
| 3,996,196 A | 12/1976 | D'Alelio |
| 5,132,396 A | 7/1992 | Keller |
| 5,159,054 A | 10/1992 | Keller |
| 5,242,755 A | 9/1993 | Keller et al. |
| 5,262,514 A | 11/1993 | Keller |
| 5,965,268 A | 10/1999 | Sastri et al. |
| 6,001,926 A | 12/1999 | Sastri et al. |
| 8,222,403 B2 | 7/2012 | Laskoski et al. |
| 8,921,510 B1 | 12/2014 | Keller et al. |
| 2006/0194944 A1 | 8/2006 | Fowler et al. |
| 2017/0002146 A1 | 1/2017 | Keller et al. |
| 2021/0040413 A1 | 11/2021 | Dustin et al. |
| 2023/0103527 A1 | 4/2023 | Drummey et al. |

FOREIGN PATENT DOCUMENTS

| | | |
|---|---|---|
| CN | 106632274 | 5/2017 |
| WO | WO 2014/021946 A | 2/2014 |
| WO | WO 2016/100259 A | 6/2016 |
| WO | WO 2018/175025 A | 9/2018 |

OTHER PUBLICATIONS

Sheng et al., "Synthesis of high performance bisphthalonitrile resins cured with self-catalyzed 4-aminophenoxy phthalonitrile," Thermochimica Acta 577 (2014) 17-24.
Patel et al., "Mechanism of thermal decomposition of poly(ether ether ketone) (PEEK) from a review of decomposition studies," Polymer Degradation and Stability 95, pp. 709-718, May 2010.
Dominguez et al., "The Effect of Curing Additive on the Mechanical Properties of Phthalonitrile-Carbon Fiber Composites," Polymer Composites, Oct. 2004, vol. 25, No. 5.

*Primary Examiner* — Terressa Boykin
(74) *Attorney, Agent, or Firm* — Bell & Manning, LLC

(57) ABSTRACT

Adhesive formulations for forming a fluorinated poly(imide-phthalonitrile) thermoset polymer are provided. Such an adhesive formulation may comprise a fluorinated imide-phthalonitrile oligomer having Formula IV

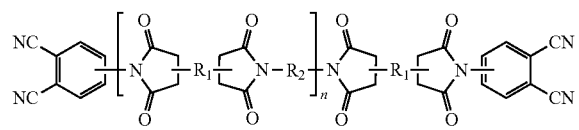

wherein $R_1$ is an unsubstituted or substituted aryl group and does not comprise an ether group; $R_2$ is an unsubstituted or substituted aryl group and does not comprise an ether group; at least one of $R_1$ and $R_2$ comprises a fluorine substituent; and n has a value of from 1 to 30.

23 Claims, 2 Drawing Sheets

FLUORINATED POLY(IMIDE-PHTHALONITRILE) ADHESIVE FORMULATIONS AND RELATED METHODS

BACKGROUND

High temperature adhesives are of interest in a range of applications, including in the transportation (e.g., aerospace) industry. There are limited high temperature adhesives available. In addition, aerospace systems requiring high temperature adhesives generally design around the temperature limitations of the available materials. This impacts cost, weight, and system level performance. Next generation aircraft may see unavoidable higher service temperatures, which places a greater premium on improving the properties of these high temperature adhesives.

SUMMARY

Provided herein are adhesive formulations and methods of making and using the adhesive formulations. The adhesive formulations comprise certain fluorinated imide-phthalonitrile oligomers free of ether groups. Embodiments of the fluorinated imide-phthalonitrile oligomers are soluble in a wide-range of solvents enabling facile processing, including the formation of sprays, pastes, and composite films thereof.

In an embodiment 3 of the adhesive formulation of embodiment 1, $R_1$ is an unsubstituted polycyclic group comprising at least two unfused aromatic rings connected via a covalent bond.

In an embodiment 4 of the adhesive formulation of embodiment 1, $R_1$ is a substituted polycyclic group comprising at least two unfused aromatic rings connected via a substituted alkyl group, the substituted alkyl group comprising the fluorine substituent.

In an embodiment 5 of the adhesive formulation of any of embodiments 1-5, $R_2$ is an unsubstituted monocyclic group or a substituted monocyclic group comprising the fluorine substituent.

In an embodiment 6 of the adhesive formulation of any of embodiments 1-5, wherein $R_2$ is an unsubstituted polycyclic group comprising at least two unfused aromatic rings connected via an unsubstituted alkyl group.

In an embodiment 7 of the adhesive formulation of any of embodiments 1-5, wherein $R_2$ is a substituted polycyclic group comprising at least two unfused aromatic rings connected via sulfone group or via a substituted alkyl group, the substituted alkyl group comprising the fluorine substituent.

In an embodiment 8 of the adhesive formulation of embodiment 1, $R_1$ comprises the fluorine substituent and $R_2$ does not comprise any fluorine substituent.

In an embodiment 9 of the adhesive formulation of any of embodiments 1-8, n is from 6 to 13.

In an embodiment 10 of the adhesive formulation of embodiment 1, the fluorinated imide-phthalonitrile oligomer has Formula IVA

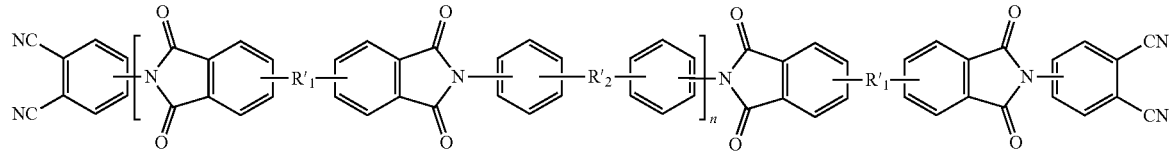

Furthermore, embodiments of the present adhesive formulations provide thermoset polymers which exhibit high levels of thermooxidative stability and adhesive strength, rendering them excellent for use under high temperature conditions.

An adhesive formulation for forming a fluorinated poly(imide-phthalonitrile) thermoset polymer is provided, which in an embodiment 1 comprises a fluorinated imide-phthalonitrile oligomer having Formula IV

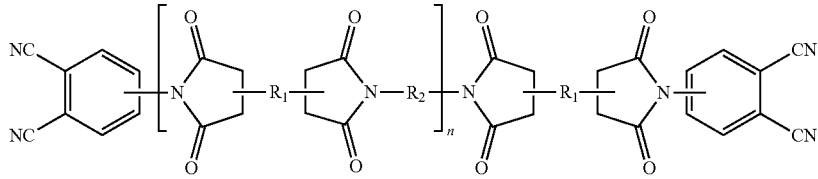

wherein $R_1$ is an unsubstituted or substituted aryl group and does not comprise an ether group; $R_2$ is an unsubstituted or substituted aryl group and does not comprise an ether group; at least one of $R_1$ and $R_2$ comprises a fluorine substituent; and n has a value of from 1 to 30.

In an embodiment 2 of the adhesive formulation of embodiment 1, $R_1$ is an unsubstituted monocyclic group.

wherein $R_1'$ is a covalent bond or a substituted alkyl group and does not comprise an ether group; $R_2'$ is a sulfone group or an unsubstituted or substituted alkyl group and does not comprise an ether group; at least one of $R_1'$ and $R_2'$ comprises the fluorine substituent and n has the value of from 1 to 30.

In an embodiment 11 of the adhesive formulation of embodiment 10, $R_1'$ is the substituted alkyl group comprising the fluorine substituent.

In an embodiment 12 of the adhesive formulation of embodiment 11, $R_1'$ is hexafluoroisopropyl, 1,1,4,4-tetrakis(trifluoromethyl)cyclohexane in a form of a six-membered ring, 1,4-difluoro-1,4-bis(trifluoromethyl)cyclohexane in a form of a six-membered ring, or 2-phenyl-2-trifluoromethylpropane.

In an embodiment 13 of the adhesive formulation of any of embodiments 10-12, $R_2'$ is the sulfone group.

In an embodiment 14 of the adhesive formulation of embodiment 10, the fluorinated imide-phthalonitrile oligomer is

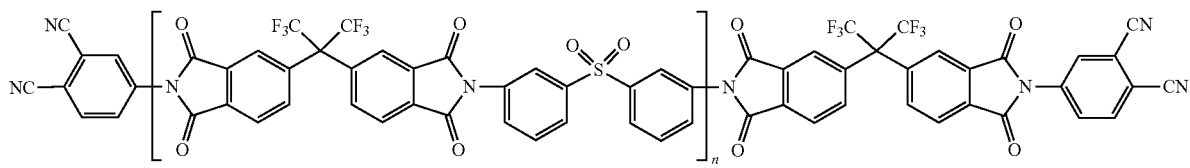

In an embodiment 15 of the adhesive formulation of embodiment 14, n is from 6 to 13.

In an embodiment 16 of the adhesive formulation of any of embodiments 1-14, the adhesive formulation further comprises a catalyst, optionally, a liquid medium, and optionally, a filler.

In an embodiment 17 of the adhesive formulation of any of embodiments 1-16, the adhesive formulation further comprises a polyimide filler.

In an embodiment 18 of the adhesive formulation of embodiment 17, the fluorinated imide-phthalonitrile oligomer is the reaction product of an aromatic dianhydride, an aromatic diamine, and an amine substituted 1,2-dicyanobenzene, and wherein the polyimide filler is a polyimide that is free of ether groups and is the reaction product of the aromatic dianhydride and the aromatic diamine.

An embodiment 19 provides a method of using the adhesive formulation of any of embodiments 1-18 comprises heating the adhesive formulation according to a curing profile to induce crosslinking reactions between phthalonitrile moieties of fluorinated imide-phthalonitrile oligomers having Formula IV to form a fluorinated poly(imide-phthalonitrile) thermoset polymer.

An embodiment 20 provides a fluorinated poly(imide-phthalonitrile) thermoset polymer formed by curing the adhesive formulation of any of embodiments 1-18, the polymer comprising crosslinked phthalonitrile moieties of fluorinated imide-phthalonitrile oligomers having Formula IV.

In an embodiment 21 of the fluorinated poly(imide-phthalonitrile) thermoset polymer of embodiment 20, the polymer has a degradation temperature of greater than 520° C., an average maximum load of from 300 psi to 6,000 psi, an adhesion loss of no more than 75% after exposure to a temperature of 375° C. in air for 100 hours, or combinations thereof.

An embodiment 22 provides an adhesive article comprising an aerospace structure and a layer of the adhesive formulation of any of embodiments 1-18 on a surface of the aerospace structure, optionally, wherein the layer is cured to form a fluorinated poly(imide-phthalonitrile) thermoset polymer comprising crosslinked phthalonitrile moieties of fluorinated imide-phthalonitrile oligomers having Formula IV.

An embodiment 23 provides a fluorinated imide-phthalonitrile oligomer having formula

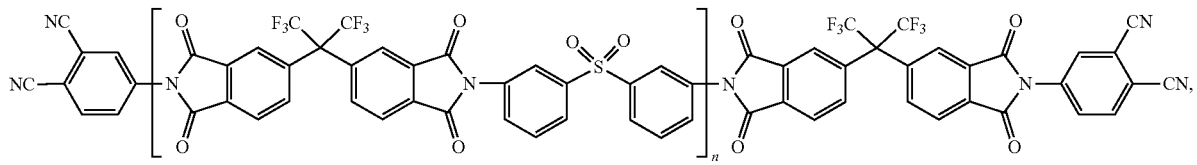

wherein n has a value of from 6 to 13.

Other features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

DETAILED DESCRIPTION

Figure 1:
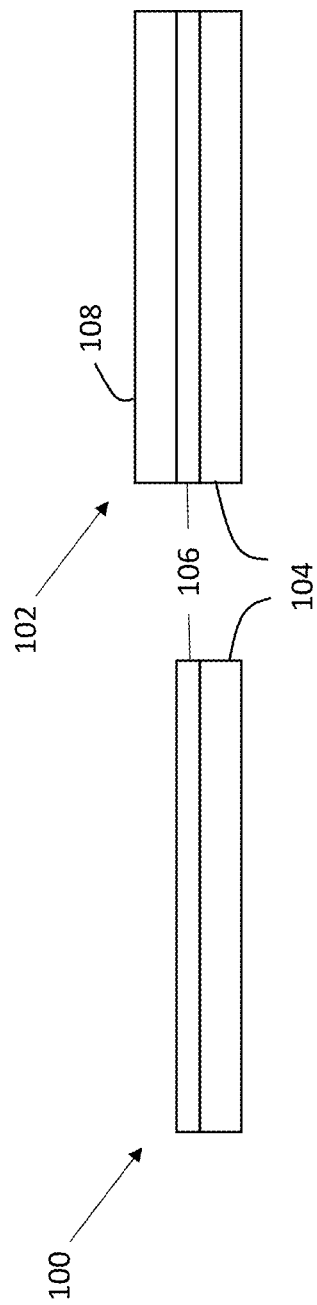
FIG. 1 shows schematics of illustrative adhesive articles comprising any of the disclosed adhesive formulations.

Provided herein are adhesive formulations and methods of making and using the adhesive formulations. Fluorinated imide-phthalonitrile oligomers used in the adhesive formulations are also provided as well as the fluorinated poly(imide-phthalonitrile) thermoset polymers formed from the adhesive formulations.

Definitions

Alkyl group refers to a linear, branched or cyclic alkyl group in which the number of carbons may range from, e.g., 1 to 24, 1 to 12, 1 to 6, or 1 to 4. A cyclic alkyl group may be referred to as a cycloalkyl group. Cycloalkyl groups include those such as cyclopentyl, cyclohexyl, and the like. The alkyl group may be unsubstituted, by which it is meant the alkyl group contains no heteroatoms. An unsubstituted alkyl group encompasses an alkyl group in which one or more bonds to a carbon(s) or hydrogen(s) are replaced by a bond to an unsubstituted aromatic ring, e.g. benzyl. The alkyl group may be substituted, by which it is meant an unsubstituted alkyl group in which one or more bonds to a carbon(s) or hydrogen(s) are replaced by a bond to non-hydrogen and non-carbon atoms.

Aryl group refers to a monocyclic aryl group having one aromatic ring (e.g., benzene) or a polycyclic group having more than one aromatic ring (e.g., two, three, etc. rings).

Monocyclic aryl groups may be unsubstituted or substituted as described above with respect to alkyl groups. Regarding polycyclic groups, neighboring aromatic rings may be fused or unfused. Neighboring unfused aromatic rings may be joined together directly via a covalent bond or via another group, e.g., a substituted or unsubstituted alkyl group, a sulfone group, etc. The aromatic rings of a polycyclic group may be unsubstituted or substituted as described above with respect to monocyclic aryl groups.

Ether group refers to an oxygen atom covalently bound to an unsubstituted or substituted alkyl group or an unsubstituted or substituted aryl group.

In the present disclosure, the various chemical groups may be referred to by the corresponding chemical compound or a radical thereof. For example, both "benzene" and "benzyl" may be used in reference to an illustrative unsubstituted monocyclic aryl group.

Regarding substituents, non-hydrogen and non-carbon atoms include, e.g., a halogen atom in halides such as F, Cl, Br, and I; an oxygen atom in groups such as hydroxyl groups, alkoxy groups, aryloxy groups, carbonyl groups, carboxyl groups, and ester groups; a sulfur atom in groups such as thiol groups, alkyl and aryl sulfide groups, sulfone groups, sulfonyl groups, and sulfoxide groups; a nitrogen atom in groups such as amines, amides, alkylamines, dialkylamines, arylamines, alkylarylamines, diarylamines, N-oxides, imides, enamines, imines, oximes, hydrazones, and nitriles; and a phosphorus atom in groups such as phosphines, and phosphoryls.

A phthalonitrile moiety refers to a portion of a molecule, compound, and the like, the portion having the following structure:

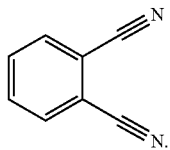

The term "crosslink" and the like refer to covalent bonds formed between cyano groups on different phthalonitrile moieties induced by heat and generally, a curing agent. The crosslinking generally occurs between different phthalonitrile moieties of distinct molecules, e.g., the present fluorinated imide-phthalonitrile oligomers.

Fluorinated Imide-Phthalonitrile Oligomer

The fluorinated imide-phthalonitrile oligomer of the present adhesive formulations is the reaction product of an aromatic dianhydride, an aromatic diamine, and a phthalonitrile endcapper. These reactants combine according to well-established chemical reactions, thereby changing the chemical form of the reactants. However, as the reactants are still identifiable in the fluorinated imide-phthalonitrile oligomer formed therefrom, the oligomer may be identified with reference to the reactants themselves. The aromatic dianhydride comprises an aryl group, but does not comprise an ether group. The aromatic diamine comprises an aryl group, but does not comprise an ether group. The phthalonitrile endcapper does not comprise an ether group. The resulting fluorinated imide-phthalonitrile oligomer formed from these reactants also does not comprise an ether group. However, at least one of the aromatic dianhydride and the aromatic diamine comprises at least one fluorine substituent. Both the aromatic dianhydride and the aromatic diamine may each comprise at least one fluorine substituent. The aromatic dianhydride, aromatic diamine, and phthalonitrile endcapper forming the fluorinated imide-phthalonitrile oligomers are further described below.

The aromatic dianhydride may be represented by Formula I:

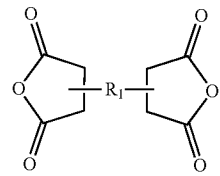

wherein $R_1$ is an unsubstituted or substituted aryl group, wherein $R_1$ does not comprise an ether group. In embodiments of Formula I, $R_1$ is a substituted aryl group comprising at least one fluorine substituent.

In embodiments of Formula I, $R_1$ is an unsubstituted monocyclic group (e.g., benzyl). An illustrative such aromatic dianhydride is pyromellitic dianhydride.

In embodiments of Formula I, $R_1$ is an unsubstituted polycyclic group. In embodiments, the unsubstituted polycyclic group comprises at least two unfused aromatic rings. In embodiments, the at least two unfused aromatic rings are connected directly via a covalent bond. An illustrative such aromatic dianhydride is 3,3',4,4'-biphenylene dianhydride.

In embodiments of Formula I, $R_1$ is a substituted polycyclic group. In embodiments, the substituted polycyclic group comprises at least two unfused aromatic rings. Here, "unfused" may refer to the two aromatic rings not being directly fused to each other. In embodiments, the at least two unfused aromatic rings are connected via a substituted alkyl group. The substituted alkyl group may form a ring, e.g., a six-membered ring, which itself is fused between the two aromatic rings. In embodiments, the substituted alkyl group comprises at least one fluorine substituent. In embodiments, the substituted alkyl group is hexafluoroisopropyl, 1,1,4,4-tetrakis(trifluoromethyl)cyclohexane (which may form the six-membered ring as noted above), 1,4-difluoro-1,4-bis(trifluoromethyl)cyclohexane (which may also form the six-membered ring as noted above), or 2-phenyl-2-trifluoromethylpropane. Illustrative such aromatic dianhydrides according to Formula I include 4,4'-(hexafluoroisopropylidene)diphthalic anhydride; 9,10-Difluoro-9,10-bis(trifluoromethyl)-9,10-dihydroanthracene-2,3,6,7-tetracarboxylic acid dianhydride; and 4,4'-(2,2,2-trifluoro-1-phenylethylidene) diphthalic anhydride.

In forming the fluorinated imide-phthalonitrile oligomer, a single type of aromatic dianhydride may be used or multiple, different types of aromatic dianhydrides.

The aromatic dianhydride may be represented by Formula IA:

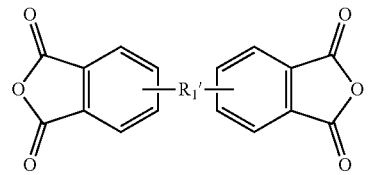

wherein $R_1'$ is a covalent bond or a substituted alkyl group, wherein $R_1'$ does not comprise an ether group. The substituted alkyl group may form a ring, e.g., a six-membered ring fused between the two aromatic rings. In embodiments of Formula IA, $R_1'$ is a substituted alkyl group comprising at least one fluorine substituent. In embodiments, the substituted alkyl group comprises at least one fluorine substituent. In embodiments, the substituted alkyl group is hexafluoroisopropyl, 1,1,4,4-tetrakis(trifluoromethyl)cyclohexane (forming a six-membered ring as noted above), 1,4-difluoro-1,4-bis(trifluoromethyl)cyclohexane (also forming a six-membered ring as noted above), or 2-phenyl-2-trifluoromethylpropane. Illustrative aromatic dianhydrides according to Formula IA include 3,3',4,4'-biphenylene dianhydride; 4,4'-(hexafluoroisopropylidene)diphthalic anhydride; 9,10-Difluoro-9,10-bis(trifluoromethyl)-9,10-dihydroanthracene-2,3,6,7-tetracarboxylic acid dianhydride; and 4,4'-(2,2,2-trifluoro-1-phenylethylidene) diphthalic anhydride.

The aromatic diamine to be reacted with the aromatic dianhydride may be represented by Formula II, $H_2N$—$R_2$—$NH_2$, wherein $R_2$ is an unsubstituted or substituted aryl group, wherein $R_2$ does not comprise an ether group. In embodiments of Formula II, $R_2$ is a substituted aryl group comprising at least one fluorine substituent.

In embodiments of Formula II, $R_2$ is an unsubstituted monocyclic group (e.g., benzyl). Illustrative such aromatic diamines include o-phenylenediamine, m-phenylenediamine, and p-phenylenediamine.

In embodiments of Formula II, $R_2$ is a substituted monocyclic group. In embodiments, the substituted monocyclic group comprises at least one fluorine substituent (e.g., fluorobenzyl). An illustrative such aromatic diamine is 4-fluoro-1,3-diaminobenzene.

In embodiments of Formula II, $R_2$ is an unsubstituted polycyclic group. In embodiments, the unsubstituted polycyclic group comprises at least two unfused aromatic rings. (The term "unfused" may have the same meaning as used with respect to Formula I.) In embodiments, the at least two unfused aromatic rings are connected via an unsubstituted alkyl group (e.g., methyl). Illustrative such aromatic diamines include 4,4'-methylenedianiline, 3,4'-methylenedianiline, and 3,3'-methylenedianiline.

In embodiments of Formula II, $R_2$ is a substituted polycyclic group. In embodiments, the substituted polycyclic group comprises at least two unfused aromatic rings. (The term "unfused" may have the same meaning as used with respect to Formula I.) In embodiments, the at least two unfused aromatic rings are connected via a sulfone group. Illustrative such aromatic diamines include bis(3-aminophenyl) sulfone and bis(4-aminophenyl) sulfone. In embodiments, the at least two unfused aromatic rings are connected via a substituted alkyl group. In embodiments, the substituted alkyl group comprises at least one fluorine substituent (e.g., hexafluoroisopropyl). An illustrative such diamine is 4,4'-(hexafluoroisopropylidene)dianiline.

The aromatic diamine may be represented by Formula IIA:

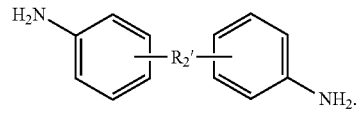

wherein $R_2'$ is a substituted alkyl group or a sulfone group, wherein $R_2'$ does not comprise an ether group. In embodiments of Formula IIA, $R_2'$ is a substituted alkyl group comprising at least one fluorine substituent (e.g., hexafluoroisopropyl). Illustrative aromatic diamines according to Formula IIA include 4,4'-methylenedianiline, 3,4'-methylenedianiline, 3,3'-methylenedianiline, bis(3-aminophenyl) sulfone, bis(4-aminophenyl) sulfone, and 4,4'-(hexafluoroisopropylidene)dianiline.

In forming the fluorinated imide-phthalonitrile oligomer, a single type of aromatic diamine may be used or multiple, different types of aromatic diamines.

The phthalonitrile endcapper to be reacted with the aromatic dianhydride and the aromatic diamine is an amine substituted 1,2-dicyanobenzene. The phthalonitrile endcapper may be represented by Formula III:

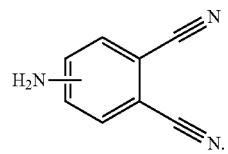

Synthesis of the fluorinated imide-phthalonitrile oligomer involves combining the aromatic dianhydride, the aromatic diamine, and the phthalonitrile endcapper in a solvent(s) under conditions to induce chemical reactions between anhydride and amine groups to form imide groups. The phthalonitrile endcapper may be combined and reacted together with the aromatic dianhydride and the aromatic diamine, or the phthalonitrile endcapper may be separately added and reacted later. The relative amounts of the aromatic dianhydride, the aromatic diamine, and the phthalonitrile endcapper may be adjusted to achieve a desired amount of polymerization and molecular weight as further described below. Suitable solvent(s) include those in which the reactants dissolve such as N-methyl-2-pyrrolidone. These conditions generally include use of an elevated temperature (i.e., greater than room temperature) and a sufficient period of time. Suitable temperatures include those of from 100° C. to 250° C., from 110° C. to 200° C., and from 120° C. to 180° C. Suitable periods of time include those of from 1 hour to 10 hours, from 2 hours to 8 hours, and from 3 hours to 6 hours. Mixing may be used during the reaction, e.g., mixing from 100 RPM to 500 RPM. Recovery of the fluorinated imide-phthalonitrile oligomer from the reaction mixture may be carried out via precipitation in an appropriate solvent, e.g., methanol. The recovered fluorinated imide-phthalonitrile oligomer may be further dried, e.g., using heat (e.g., at from 50° C. to 100° C.) and vacuum. Other illustrative details of fluorinated imide-phthalonitrile oligomer synthesis are described in the Examples, below.

The fluorinated imide-phthalonitrile oligomer may be represented by Formula IV

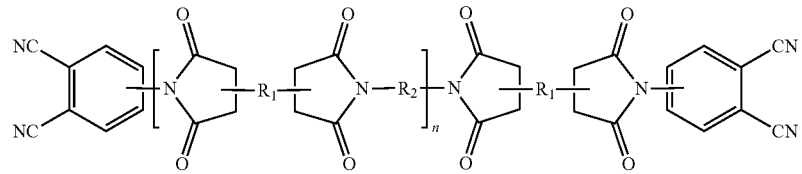

wherein $R_1$ is as defined above with respect to the aromatic dianhydride and $R_2$ is as defined above with respect to the aromatic diamine. The synthesis of the fluorinated imide-phthalonitrile oligomer generally results in different numbers of the imide linking group being incorporated between the two terminal phthalonitrile moieties and a corresponding distribution of molecular weights. Thus, "n" is used to denote the number of imide linking groups that are incorporated, on average. The value of n (and thus, the degree of polymerization and the molecular weight of the fluorinated imide-phthalonitrile oligomer) may be controlled by selecting various relative ratios of the reactants in the synthesis described above. However, in embodiments, the value of n is in a range of from 1 to 30. This includes from 4 to 30, from 4 to 25, from 4 to 20, from 4 to 15, from 6 to 15, and from 6 to 13. Gel phase chromatography in an appropriate solvent or end group analysis via $^{13}C$ NMR may be used to determine the value of n as well as the molecular weight. In the present disclosure, the term "fluorinated imide-phthalonitrile oligomer" encompasses each of the fluorinated imide-phthalonitrile compounds formed by the reaction of the aromatic dianhydride, the aromatic diamine, and the phthalonitrile endcapper, each of which may have a different number of the imide linking group(s) and a different molecular weight.

The fluorinated imide-phthalonitrile oligomer may be represented by Formula IVA.

case of the bisphthalonitrile compound, suitable linking groups include an aromatic ether, a thioether, an imide, a sulfone, a heterocyclic ether, an aromatic ketone, a urethane, a urea, an amide, an ester, an oxamide, and combinations thereof. However, in embodiments, linking groups containing ether groups such as an aromatic ether and a heterocyclic ether are not used. Bisphthalonitrile compounds are commercially available or may be formed using known synthetic methods. Similar to the fluorinated imide-phthalonitrile oligomer, different numbers of the linking group(s) may end up being incorporated into the bisphthalonitrile compounds between the two terminal phthalonitrile moieties and a corresponding distribution of molecular weights. The term "bisphthalonitrile compound" refers to each of the bisphthalonitrile compounds that may be formed, each of which may have a different number of the linking group(s) and a different molecular weight. Illustrative bisphthalonitrile compounds include those described in U.S. Pat. No. 8,222,403; U.S. Pat. Pub. No. 20170002146; International Pat. Pub. No. 2014021946; and International Pat. Pub. No. 2018175025; the disclosures of each of which are incorporated by reference for purposes of the bisphthalonitrile compounds.

If used, any desired amount of a bisphthalonitrile compound may be used in addition to the fluorinated imide-phthalonitrile oligomer. When present, a weight ratio of the (bisphthalonitrile compound):(fluorinated imide-phthaloni-

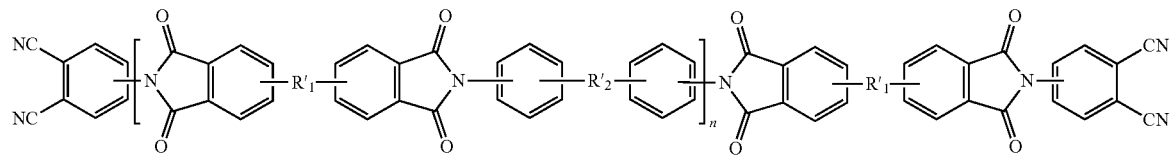

wherein $R_1'$ is as defined above with respect to the aromatic dianhydride and $R_2'$ is as defined above with respect to the aromatic diamine and n is defined above with respect to Formula IV.

An illustrative fluorinated imide-phthalonitrile oligomer is shown below. In this embodiment, n is 6. However, the value of n may be as defined above with respect to Formula IV.

trile oligomer) may be in a range of from 100:1 to 1:100. This includes from 75:1 to 1:75, from 50:1 to 1:50, from 25:1 to 1:25, and from 1:10 to 10:1. When multiple types of bisphthalonitrile compounds and/or fluorinated imide-phthalonitrile oligomers are used, these amounts refer to the total amount of the multiple bisphthalonitrile compounds/fluorinated imide-phthalonitrile oligomers.

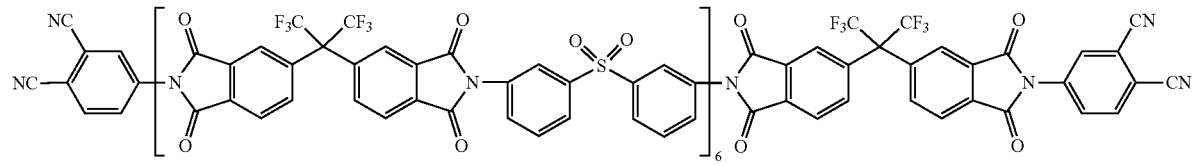

Bisphthalonitrile Compounds

In addition to the fluorinated imide-phthalonitrile oligomer, the present adhesive formulations may further comprise a bisphthalonitrile compound. A single type or combinations of different types of bisphthalonitrile compounds may be used. The term "bisphthalonitrile compound" is distinguished from the fluorinated imide-phthalonitrile oligomers described herein, i.e., the terms are used to refer to chemical distinct compounds. However, like the fluorinated imide-phthalonitrile oligomers, the bisphthalonitrile compound also comprises two terminal phthalonitrile moieties which are connected via one or more linking groups. In the In embodiments, however, bisphthalonitrile compounds are not used and the adhesive formulation is free of any such bisphthalonitrile compounds (other than the present imide-phthalonitrile oligomers).

Phthalonitrile Additives

The present adhesive formulations may further comprise a phthalonitrile additive. A single type or combinations of different types of phthalonitrile additives may be used. Phthalonitrile additives are small molecules comprising one or more phthalonitrile moieties (e.g., 2 such moieties). The additives are distinguished from the oligomers, prepolymers, and thermoset polymers described herein. Although the bisphthalonitrile compound of the phthalonitrile precursor composition may also be a small molecule, the bisphthalonitrile compound is a different compound, i.e., a different chemical species, from the phthalonitrile additive. Similarly, curing agents and phthalonitrile additives refer to different compounds. Illustrative phthalonitrile additives include those described in U.S. Pat. Pub. No. 2021/040413, which is hereby incorporated by reference in its entirety.

If used, any desired amount of a phthalonitrile additive may be used. When present, an amount of from 2 mol % to 30% may be used. The term "mol %" refers to the mole percentage of the phthalonitrile additive as compared to the total moles of the phthalonitrile additive, the fluorinated imide-phthalonitrile oligomer, and the bisphthalonitrile compound (if present). The amount includes from 2 mol % to 25 mol %, from 5 mol % to 20 mol %, and from 5 mol % to 15 mol %. When multiple types of phthalonitrile additives are used, these amounts refer to the total amount of the multiple phthalonitrile additives.

In embodiments, however, phthalonitrile additives are not used and the adhesive formulation is free of any such phthalonitrile additives.

Curing Agents

Generally, the present adhesive formulations comprise a curing agent, although in embodiments, this is not necessary. The curing agents include those capable of inducing crosslinking reactions between phthalonitrile moieties, i.e., reactions between cyano groups on phthalonitrile moieties to form covalent crosslinks. These covalent crosslinks may include polytriazine-type, polyindoline-type, phthalocyanine-type crosslinks, and combinations thereof. A single type or combinations of different types of curing agents may be used. If a curing agent is not included, these types of crosslinking reactions may still occur, albeit at a slower rate.

Illustrative curing agents include amines, diamines, phenolics, acids, metals, metal salts, and combinations thereof. Regarding diamines, illustrative curing agents include 4,4'-(1,3-phenylenedioxy)dianiline; 4,4'-(1,4-phenylenedioxy)dianiline; bis[4-(4-aminophenoxy)phenyl]sulfone; 4,4'-(4,4'-isopropylidenediphenyl-1,1'-diyldioxy)dianiline; 4,4'-(1,3-phenylenediisopropylidene)dianiline; 4,4'-(1,4-phenylenediisopropylidene)dianiline; 4,4'-(1,1'-biphenyl-4,4'-diyldioxy)dianiline, 4,4'-methylenedianiline; 4,4'-sulphonyldianiline; 4,4'-methylene-bis(2-methylaniline); 3,3'-methylenedianiline; 3,4'-methylenedianiline; 4,4'-oxydianiline; 4,4'-(isopropylidene)dianiline; 4,4'-(hexafluoroisopropylidene)dianiline; 4,4'-(hexafluoroisopropylidene)bis(p-phenyleneoxy)dianiline; 4,4'-diaminobenzophenone; and melamine. Regarding phenolics, hydroxyquinone is an illustrative curing agent. Regarding metals and metal salts, illustrative curing agents include copper acetylacetonate, palladium acetylacetonate, cobalt acetylacetonate, nickel acetylacetonate, and iron acetylacetonate. Other illustrative curing agents include those described in U.S. Pat. Nos. 4,408,035; 4,410,676; 5,247,060; 8,735,532; 8,921,510; and International Pat. Pub. No. 2014021946; the disclosures of each of which are incorporated by reference for purposes of the curing agents. In embodiments, the curing agent does not comprise an ether group. In embodiments, the curing agent may comprise an ether group, but the curing agent is present at an amount of no more than 5 weight %, not more than 3 weight %, or no more than 2 weight %. (Here, weight % refers to the total amount of the curing agent as compared to the total amount of the curing agent, the fluorinated imide-phthalonitrile oligomer, the bisphthalonitrile compound (if present), and the phthalonitrile additive (if present).)

If used, any desired amount of a curing agent may be may be used. When present, an amount of from 1 weight % to 10 weight % may be used. Here, weight % refers to the total amount of the curing agent as compared to the total amount of the curing agent, the fluorinated imide-phthalonitrile oligomer, the bisphthalonitrile compound (if present), and the phthalonitrile additive (if present). The amount includes from 2 weight % to 8 weight %, and from 2 weight % to 5 weight %. When multiple types of curing agents are used, these amounts refer to the total amount of the multiple curing agents.

In embodiments, the phthalonitrile moieties in the adhesive formulations (i.e., those of the fluorinated imide-phthalonitrile oligomer and if present, the other phthalonitrile components (bisphthalonitrile compound and/or phthalonitrile additive)) are uncrosslinked. This means that the fluorinated imide-phthalonitrile oligomer and if present, the other phthalonitrile components have not been exposed to conditions to induce crosslinking reactions to provide the resulting covalent crosslinks described above. This does not necessarily mean that there are no such crosslinks in the adhesive formulation, but that the amount is too small to have a material effect on the adhesive formulation.

In other embodiments, however, a portion (less than all) of the phthalonitrile moieties in the adhesive formulations are crosslinked. This may be accomplished by exposing the fluorinated imide-phthalonitrile oligomer and if present, the other phthalonitrile components to conditions to induce crosslinking reactions so as to achieve partial curing. In these embodiments, it can be useful to also include a curing agent. Conditions to achieve partial curing are different than those used to convert the adhesive formulation into a thermoset polymer, and involve lower temperatures and/or shorter times. Thus, the number of covalent crosslinks, i.e., the degree of crosslinking, achieved during partial curing is less than in the thermoset polymer. Although the conditions to achieve partial curing will depend upon the type of fluorinated imide-phthalonitrile oligomer, illustrative conditions include heating at a temperature of no more than 250° C. for no more than 120 minutes. This includes a temperature in a range of from 175° C. to 250° C. or 190° C. to 210° C. for from 20 minutes to 120 minutes or from 80 minutes to 100 minutes.

The result of partial curing converts a portion (less than all) of the fluorinated imide-phthalonitrile oligomer and if present, a portion (less than all) of the other phthalonitrile components to a prepolymer comprising the covalent crosslinks described above. However, uncrosslinked/unreacted components generally remain so that the prepolymer and thus, the adhesive formulation also comprises these uncrosslinked/unreacted components. The present prepolymers may be referred to herein as fluorinated imide-phthalonitrile prepolymers.

Morphology

The present adhesive formulations may be in the form of a solid. The term "solid" encompasses various morphologies including particles, powder, and the like.

Other forms that the adhesive formulations may adopt include pastes and sprays. These other forms are distinguished from solids by further including a liquid medium. These other forms are distinguished from each another generally by including different amounts of the liquid medium and having different shear viscosities. For example, pastes may be characterized by a shear viscosity of greater than 1,000 cps, greater than 10,000 cps, greater than 100,000 cps, or in a range of from 1,200 to 500,000 cps, all as measured at room temperature and 100 Hz. Sprays may be characterized by a shear viscosity of less than 300 cps, less than 150 cps, less than 50 cps, or in a range from 0.5 to 250 cps, all as measured at room temperature and 100 Hz. In both cases, these shear viscosities may be measured using a Malvern viscometer with a parallel plate geometry (25 mm plate, 0.20 mm gap) and a shear rate range from 0.1 Hz to 1000 Hz.

Another form for the adhesive formulations is that of a composite film (also referred to as a "prepreg"). The composite films also generally include an amount of the liquid medium as well as a non-woven or woven fibrous material comprising a plurality of fibers, such as a scrim comprising glass fibers, carbon fibers, alumina fibers, ceramic fibers, or combinations thereof. The liquid medium having the fluorinated imide-phthalonitrile oligomer, the other phthalonitrile components (if present), the curing agent (if present) dispersed or dissolved therein are infiltrated into the fibrous material.

The liquid medium may comprise one or more solvents, e.g., organic solvents. Illustrative solvents include alcohols and ketones such as acetone, methyl ethyl ketone, methyl propyl ketone, methyl isobutyl ketone, n-butyl acetate, 2-phenoxyethanol, N-methylpyrrolidone. These are examples of polar organic solvents. Other illustrative solvents include nonpolar organic solvents such as toluene, xylene, and benzene. The amount of liquid medium (as well as the relative amounts of different types of solvents, if more than one type is used) used depends on the desired form of the adhesive formulation. However, in embodiments, the amount of liquid medium is at least 30 weight % as compared to the total weight of the adhesive formulation (excluding the fibrous material, if present). This includes at least 40 weight %, at least 50 weight %, at least 60 weight %, and in a range of from 30 weight % to 80 weight %. The combined amount of the fluorinated imide-phthalonitrile oligomer, the other phthalonitrile components (if present), and the curing agent (if present) may be no more than 10 weight % as compared to the total weight of the adhesive formulation (excluding the fibrous material, if present). This includes no more than 20 weight %, no more than 40 weight %, no more than 50 weight %, no more than 70 weight %, and in a range of from 15 weight % to 65 weight %. As noted above, the fluorinated imide-phthalonitrile oligomer, the other phthalonitrile components (if present), and the curing agent (if present) may be present as a fluorinated imide-phthalonitrile prepolymer comprising both crosslinked and uncrosslinked/unreacted components. In such embodiments, these amounts refer to the amount of fluorinated imide-phthalonitrile prepolymer in the adhesive formulation.

Additives

The present adhesive formulations may comprise a variety of other optional additives, which refers to species chemically distinct from the fluorinated imide-phthalonitrile oligomers, fluorinated imide-phthalonitrile prepolymers, bisphthalonitrile compounds, phthalonitrile additives, and curing agents described herein. Fillers may be used as additives. Fillers are generally non-reactive with respect to the fluorinated imide-phthalonitrile oligomer and if present, the other phthalonitrile components, but rather may be added to tune the properties of the adhesive formulation and the thermoset polymer formed therefrom. Thus, the types of fillers used and their amounts may be selected depending upon the desired use for the adhesive formulation and the thermoset polymer. Combinations of different types of fillers may be used.

Illustrative fillers include carbon-based fillers such as carbon black (e.g., Super P), graphite, carbon fiber, and the like. Other fillers include metallic fillers such as nickel, silver, copper, gold, platinum, iridium, iron, titanium, zinc, and the like. Metallic fillers also include alloys comprising such metals such as stainless steel, nichrome, and the like. Other fillers include metal oxide fillers such as silica, fumed silica (e.g., Aerosil® F972), alumina, iron oxide, and the like. Other fillers include polymeric fillers such as those composed of a polyaryletherketone (e.g., polyetheretherketone (PEEK), polyetherketoneketone (PEKK)), a polyimide, and the like. In embodiments, a polyimide, e.g., a polyimide free of ether groups, is used as a polymeric filler. The polyimide may be formed from the same aromatic dianhydride and the same aromatic diamine used to form the fluorinated imide-phthalonitrile oligomer being used in the adhesive formulation. (See the Examples, below.)

The morphology of the fillers is not particularly limited. The fillers may be particulate in form and have an aspect ratio of less than 2 (encompassing spherical shapes, elliptical shapes, and the like) or have an aspect ratio of greater than 2 (encompassing elongated shapes such as wires, rods, tubes, whiskers, fibers, needles, and the like). Similarly, the dimensions of the fillers are not particularly limited. The fillers may have a nanoscale dimension in which one, two, or all three dimensions are 1000 nm or less. The fillers may have a microscale dimension in which one, two, or all three dimensions are in a range of from 1 μm to 1 mm.

In embodiments, a filler is present in the adhesive formulation at an amount of from 0.001 weight % to 10 weight % as compared to the total weight of the adhesive formulation (excluding the fibrous material, if present). This includes from 0.01 weight % to 10 weight %, and from 0.1 weight % to 10 weight %. When multiple fillers are used, these weight percentages refer to the total weight of the multiple fillers.

Other additives which may be included in the adhesive formulations include dispersants, flow agents, cure promoters, surfactants, the like, and combinations thereof. Reactive additives may be included such as allylic additives. Again, a variety of types of these components may be added to tune the properties of the adhesive formulation and the thermoset polymer formed therefrom. When present, they may be included in amounts described above with respect to the fillers.

In embodiments, the present adhesive formulation consists of one or more types of a fluorinated imide-phthalonitrile oligomer; optionally, one or more types of a bisphthalonitrile compound; optionally, one or more types of a phthalonitrile additive; optionally, one or more types of a curing agent; optionally, one or more types of a solvent; and optionally, one or more types of an additive. In embodiments, the adhesive formulation consists of one or more types of a fluorinated imide-phthalonitrile oligomer; one or more types of a curing agent; optionally, one or more types of a solvent; and optionally, one or more types of an additive. In embodiments, the adhesive formulation consists of one or more types of a fluorinated imide-phthalonitrile oligomer; one or more types of a curing agent; one or more types of a solvent; and optionally, one or more types of an additive. In any of these embodiments, the fluorinated imide-phthalonitrile oligomer may be present as a fluorinated imide-phthalonitrile prepolymer. Any of the fluorinated imide-phthalonitrile oligomers, fluorinated imide-phthalonitrile prepolymers, bisphthalonitrile compounds, phthalonitrile additives, curing agents, solvents, and additives disclosed herein may be used in any combination without limitation.

In any of these embodiments, the adhesive formulation may be in the form of a spray, a paste, or a composite film.

Methods

The adhesive formulations may be formed by combining and mixing the fluorinated imide-phthalonitrile oligomer and any other desired components at the desired amounts. As noted above, the fluorinated imide-phthalonitrile oligomer, the other phthalonitrile components (if present), and the curing agent (if present) may be present as a fluorinated imide-phthalonitrile prepolymer, which may be combined and mixed with any other desired components and the desired amounts. Pastes, sprays, and composite films may also be made according to the techniques described in U.S. patent application Ser. No. 17/572,750, METHODS FOR PREPARING PHTHALONITRILE COATING COMPOSITIONS, filed Jan. 11, 2022, which is hereby incorporated by reference in its entirety.

The adhesive formulations may be used in a variety of environments, including the aerospace industry, the automobile industry, the submarine industry, the electronics industry, the construction industry, and the like. Thus, the phrases "aerospace industry," "automobile industry," and "submarine industry" may refer to any device, craft, machine, or components thereof used in the industries such as aircraft, an airplane, a rotocraft, a boat, a submarine, a space ship, a trajectory device, a drone, a satellite, an automobile, a bus, a locomotive, a train car, and the like.

As shown in FIG. 1, any of the disclosed adhesive formulations may be applied onto a surface of a substrate 104 (e.g., a surface of an aerospace structure) to form a coating 106 thereon to provide a coated adhesive article 100. The substrate 104 may be a component used in any of the industries listed above and composed of any type of material, e.g., metal, metal alloy, glass, a composite, and the like. The application technique depends upon the form of the adhesive formulation. For example, pastes may be applied by spreading, painting, brushing, wiping, etc., while sprays are sprayed using any number of spraying techniques (e.g., spray gun). Composite films may be applied by pressing, molding, etc. The resulting coating may have any desired thickness, e.g., in a range of from 0.1 mm to 100 mm. The thickness also depends upon the form of the adhesive formulation used. In any of the embodiments, a second substrate 108 may be placed on the coating 106 which functions to adhere the two substrates 104, 108 together to form a bonded adhesive article 102.

In whichever environment and for whichever application they are to be used, the adhesive formulations (or coatings formed therefrom) are generally cured to form a thermoset polymer therefrom. The cured, thermoset polymer formed from any of the disclosed adhesive formulations may be referred to herein as a fluorinated poly(imide-phthalonitrile) thermoset. Such curing involves heating for a period of time, generally, in an inert environment. The temperatures and/or times are greater than those used to achieve the partial curing described above so as to increase (e.g., maximize) the degree of crosslinking between phthalonitrile moieties. The curing may be carried out according to a curing profile involving holds at certain temperatures for certain periods of times. The curing profile may also involve use of certain heating rates to achieve the different temperatures. Various curing profiles may be used, depending upon the selected adhesive formulation and the desired properties for the thermoset polymer. An illustrative curing profile is provided in the Examples, below. Another illustrative curing profile is 200° C. (30 minutes), 250° C. (90 minutes), 300° C. (180 minutes), 350° C. (90 minutes), 375° C. (60 minutes). The present methods may further comprise curing to convert the adhesive formulation (or coating formed therefrom) to a thermoset polymer.

The adhesive articles and thermoset polymers formed using the methods described above are also encompassed by the present disclosure.

Properties

Fluorinated poly(imide-phthalonitrile) thermoset polymers formed from the present adhesive formulations may be characterized by certain properties, including thermooxidative stability. The thermooxidative stability may be referenced as a degradation temperature, which refers to the temperature at which 5% mass loss occurs. The degradation temperature may be measured using a thermogravimetric analyzer (e.g., TGA Q500) as described in the Examples, below (see Table 1). In embodiments, the degradation temperature is greater than 515° C., greater than 520° C. or greater than 525° C. Thermooxidative stability may also be referenced as a weight % of the thermoset polymer remaining after exposing the thermoset polymer to a temperature of about 399° C. in air for about 18 hours as described in the Examples below (see Table 2). In embodiments, the remaining weight % is at least 95%, at least 96%, or at least 97%.

Fluorinated poly(imide-phthalonitrile) thermoset polymers formed from the present adhesive formulations may also be characterized by adhesive strength. Adhesive strength may be referenced as a maximum load measured as described in the Examples below (see Table 3). In embodiments, the maximum load is in a range of from 300 psi to 6,000 psi. This includes from 300 psi to 3,000 psi and from 300 psi to 1,500 psi. These may be average values as measured from a representative number of samples, e.g., 3. Adhesive strength may also be referenced as a percent adhesion loss after exposing the thermoset polymer to a temperature of about 375° C. in air for about 100 hours as described in the Examples below (see Table 4). In embodiments, the adhesion loss is no more than 75%, no more than 70%, or no more than 65%.

EXAMPLES

Materials 4,4'-(hexafluoroisopropylidene)diphthalic anhydride (6FDA) and bis(3-aminophenyl) sulfone (3-APS) were supplied by TCI Chemicals. 4-aminophthalonitrile (AmPN) was supplied by Combi Blocks. N-methyl-2-pyrrolidone (NMP), 2-phenoxyethanol, and 2-pentanone were procured from Sigma Aldrich. 4,4'-bis(3-aminophenoxy)diphenyl sulfone (mBAPS) was obtained from TCI Chemicals. Ketaspire KT-820 UFP (a polyetheretherketone (PEEK)) was purchased from Solvay Specialty Polymers and used as received. Aerosil® R 972 fumed silica was purchased from Evonik Resource Efficiency GmbH and used as received. RM-1005 (a fluorinated polyimide that does not contain ether groups) was supplied by Renegade Materials. Bisphenol A PEEK oligomeric phthalonitrile composition (including 3% by weight m-BAPS) was purchased from the Naval Research Laboratory. Bisphenol A PEEK is a non-fluorinated polyetheretherketone-based phthalonitrile (thus, contains ether groups but no fluorine).

Example 1: Synthesis of a Fluorinated Poly(Imide-Phthalonitrile) Oligomer; Lower Molecular Weight (PIPN6-6F)

Bis(3-aminophenyl) sulfone (4.00 g, 6 equivalents) and NMP (52 g) were added to a dried 3-neck round-bottomed flask equipped with a mechanical stirrer and a nitrogen inlet. The mechanical stirrer speed was set to 200 rpm. Once the contents were dissolved, the flask was heated to 100° C. then 6FDA (8.35 g, 7 equivalents) was added and stirred for 30 minutes, forming a more viscous orange solution. AmPN (0.81 g, 1.05 equivalents) was then added and stirred for an additional 10 minutes. The reaction mixture was heated to 180° C. for 6 hours, forming a dark reddish-brown solution. The reaction was cooled and precipitated into methanol. The off-white powder was dried at room temperature for 48 hours then in vacuo at 60° C. for 24 hours.

Example 2: Synthesis of a Fluorinated Poly(Imide-Phthalonitrile) Oligomer; Higher Molecular Weight (PIPN8-6F)

Bis(3-aminophenyl) sulfone (4.00 g, 8 equivalents) and NMP (51 g) were added to a dried 3-neck round-bottomed flask equipped with a mechanical stirrer and a nitrogen inlet. The mechanical stirrer speed was set to 200 rpm. Once the contents were dissolved, the flask was heated to 100° C. then 6FDA (8.05 g, 9 equivalents) was added and stirred for 30 minutes, forming a more viscous orange solution. AmPN (0.61 g, 1.05 equivalents) was then added and stirred for an additional 10 minutes. The reaction mixture was heated to 180° C. for 6 hours, forming a dark reddish-brown solution. The reaction was cooled and precipitated into methanol. The off-white powder was dried at room temperature for 48 hours then in vacuo at 60° C. for 24 hours. As compared to the oligomer of Example 1, the oligomer of Example 2 has a higher degree of polymerization (higher n value).

Example 3: Synthesis of a Polyimide Filler (HiMWPI)

Bis(3-aminophenyl) sulfone (20.00 g, 1 equivalent) and NMP (223 g) were added to a dried 3-neck round-bottomed flask equipped with a mechanical stirrer and a nitrogen inlet. The mechanical stirrer speed was set to 200 rpm. Once the contents were dissolved, the flask was heated to 100° C. then 6FDA (35.78 g, 1 equivalent) was added and stirred for 30 minutes, forming a more viscous orange solution. The reaction mixture was then heated to 180° C. for 6 hours, forming a dark reddish-brown solution. The reaction was cooled and precipitated into methanol. The off-white powder was dried at room temperature for 48 hours then in vacuo at 60° C. for 24 hours.

Example 4

The following cure schedule was used to cure samples under nitrogen in a box furnace: 300° C. (3 hours), 350° C. (3 hours), 375° C. (3 hours), 400° C. (2 hours).

Example 4.1: Powder-Only Formulations

The following were combined in a Flacktek cup and mixed at 2000 RPM for 1 minute: 5.00 g Example 1, 0.50 g Ketaspire KT820 UFP, 0.15 g mBAPS, and 0.01 g Aerosil R 972. The contents were poured out into an aluminum planchet for curing following Example 4.

Example 5.1: PIPN6-6F Paste Formulation 4.00 g of Example 1, 0.12 g of m-BAPS, and three 0.2" diameter glass beads were added to a mixing cup and mixed for 1 minute at 800 RPM. 3.00 g of 2-phenoxyethanol and 1.00 g of 2-pentanone were added and subsequently mixed for 6 minutes at 1500 RPM. The resulting solution was a clear and viscous paste that may be buttered onto a substrate using a spatula or similar tool. Once applied, this formulation was cured according to Example 4.

Example 5.2: PIPN6-6F HiMWPI Blend Paste Formulation 4.00 g of Example 1, 0.12 g of m-BAPS, 0.60 g of Example 3, and three 0.2" diameter glass beads were added to a mixing cup and mixed for 1 minute at 800 RPM. 3.00 g of 2-phenoxyethanol and 1.00 g of 2-pentanone were added and subsequently mixed for 6 minutes at 1500 RPM. The resulting solution was a viscous paste that may be buttered onto a substrate using a spatula or similar tool. Once applied, this formulation was cured according to Example 4.

Example 6: Spray Formulation 15.00 g of Example 1, 0.45 g of m-BAPS, 0.04 g of Aerosil® R972, and 1.50 g of Ketaspire KT-820 UFP were added to a mixing cup and mixed for 1 minute at 800 RPM. 12.00 g of 2-phenoxyethanol and 33.00 g of 2-pentanone were added and subsequently mixed for 8 minutes at 2000 RPM. The resulting solution was poured into a spray cup containing a 200-mesh screen for filtration and may be sprayed using a high-volume low-pressure (HVLP) spray gun. Once applied, this formulation was cured according to Example 4.

Example 7: Flexible Prepreg 32.00 g of Example 1, 0.96 g of m-BAPS, 0.08 g of Aerosil® R972, and 3.20 g Ketaspire KT-820 UFP were added to a mixing cup and mixed for 1 minute at 800 RPM. 24.00 g of 2-phenoxyethanol, 8.00 g of 2-pentanone, and five 0.2" diameter glass beads were added and subsequently mixed for 2 minutes at 1200 RPM, 2 minutes at 1500 RPM, and 2 minutes at 2000 RPM. 24.00 g of 2-pentanone was added and the solution was mixed for 1 minute at 1200 RPM, 1 minute at 1500 RPM, and 2 minutes at 2000 RPM. The solution was then filtered through a 200-mesh screen. A 1 mil thick glass scrim was placed onto a silanized release film with 30 mil shims taped along the edge. The resulting solution was poured onto the scrim and a glass rod was used to cast the solution at a 30-mil wet thickness. The solution was allowed to dry in a hood for two days. The resultant film may be referred to as a room temperature flexible prepreg. Once applied, this formulation was cured according to Example 4.

Example 8: PIPN8-6F Paste Formulation 5.00 g of Example 2, 0.15 g of m-BAPS, 0.01 g Aerosil R972, 0.50 g Ketaspire KT-820 UFP, and three 0.2" diameter glass beads were added to a mixing cup and mixed for 1 minute at 800 RPM. 5.00 g of 2-pentanone was added and subsequently mixed for 4 minutes at 1500 RPM. The resulting solution was a viscous paste that may be buttered onto a substrate using a spatula or similar tool. Once applied, this formulation was cured according to Example 4.

Comparative Example 1: RAM1005

RM 1005 was poured into an aluminum planchet and cured according to the following schedule: 177° C. (2 hours vacuum), 316° C. (2 hours).

Comparative Example 2: Bis A PEEK PN

Bisphenol A PEEK oligomeric phthalonitrile composition was poured into an aluminum planchet and cured under nitrogen according to the following: 200° C. (1.5 hours), 250° C. (6 hours), 300° C. (3 hours), 350° C. (3 hours), 375° C. (6 hours).

Comparative Example 3: Bis A PEEK PN Paste 4.0 g of MIBK was added to a mixing cup along with two 0.2" diameter glass beads followed by 0.5 g Ketaspire KT-820 UFP, 0.01 g R972 fumed silica, and 5.5 g of the Bis A PEEK oligomeric phthalonitrile composition (including 3% by weight m-BAPS). This solution was mixed in a centrifugal mixer at 1500 RPM for 4 minutes. The cup was then sealed using parafilm and allowed to sit for two days. The resulting solution was a viscous paste that may be buttered onto substrates using a spatula or similar tool. Once applied, this formulation was cured in nitrogen according to the following schedule: 200° C. (0.5 hours), 250° C. (1.5 hours), 300° C. (3 hours), 350° C. (1.5 hours), 375° C. (1 hour).

Thermooxidative Stability Testing

Figure 2:
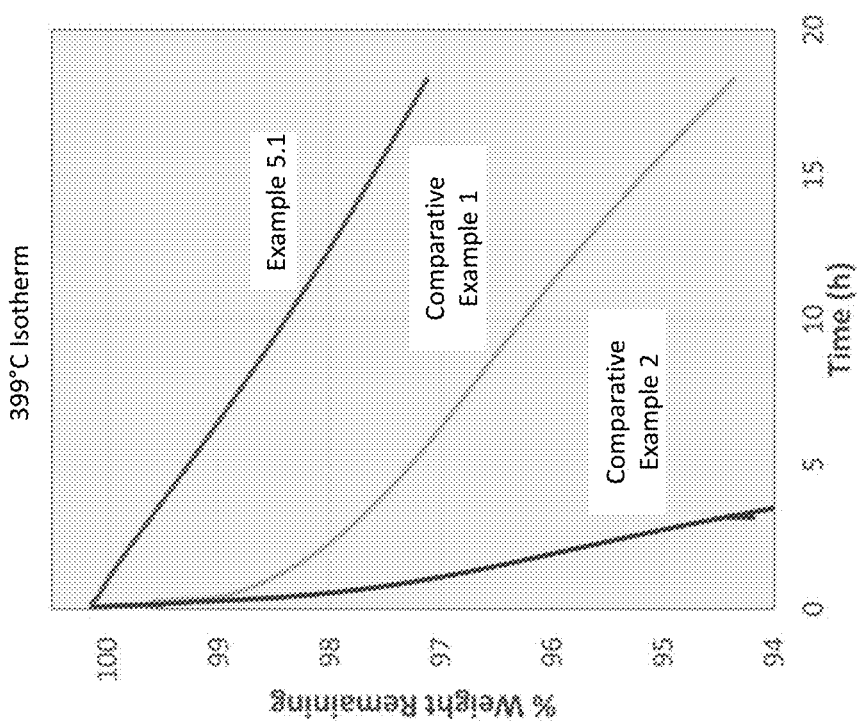
FIG. 2 shows isothermal oxidative degradation profiles for an illustrative adhesive formulation (Example 5.1) and two comparative adhesive formulations.

Thermooxidative stability measurements of post-cured samples were carried out using a thermogravimetric analyzer (TGA Q500) similarly to ASTM E1131-20. Briefly, samples of 10-15 mg were evaluated using a 10° C./min temperature ramp from ambient temperature to 1000° C. in air. For long term thermal stability tests, samples of 10-15 mg were evaluated using a 25° C./min temperature ramp from ambient temperature to 370° C. or 399° C. followed by 18 hours at 370° C. or 399° C. in air. The results are shown in Tables 1 and 2, below. FIG. 2 also shows the 399° C. isothermal degradation profile for Example 5.1 and Comparative Examples 1 and 2.

TABLE 1

Thermooxidative stability following 10° C./min temperature ramp to 1000° C. $T_{d,\ 5\%}$ is the temperature at which 5% mass loss occurs.

| Example | Degradation temperature ($T_{d,\ 5\%}$ ° C.) |
|---|---|
| Example 1 | 525 |
| Example 2 | 524 |
| Example 3 | 361 |
| Example 5.1 | 528 |
| Comparative Example 1 | 510 |
| Comparative Example 2 | 496 |

TABLE 2

Long term thermal stability following an 18 hour hold at 370° C. or 399° C. in air.

| Example | 370° C. Isotherm Weight Remaining (%) | 399° C. Isotherm Weight Remaining (%) |
|---|---|---|
| Example 1 | 98.4 | 97.1 |
| Example 2 | 97.3 | ND |
| Example 5.1 | ND | 97.0 |
| Example 5.2 | ND | 96.7 |
| Comparative Example 1 | 97.3 | 94.4 |
| Comparative Example 2 | 79.2 | 38.4 |

ND = not determined.

The results show that Examples 1, 2, 5.1, and 5.2 significantly outperform both Comparative Examples 1 and 2 (higher $T_{d,5\%}$ and greater long-term stability at 399° C.).

Lap-Shear Testing

Lap-shear panels (single-lap-joint) were prepared according to ASTM D1002-10 (2019). Samples were made with primed (Pasa Jell 107 and BR 680) titanium coupons (1"×4"×0.063") utilizing a 1"×1" adhesive contact area. A thin layer of the paste was spread on both sides of the corresponding coupon set and a 1 mil glass scrim was added in the center of one coupon to control the bondline thickness. The corresponding panels were then aligned by hand and firmly pressed together to create a single-lap-joint panel. Each panel was appropriately balanced (including top weight) and placed in a furnace (nitrogen purged). The samples were then cured according to Example 4. Lap-shear testing was performed with an Instron 5969 mechanical tester using a crosshead speed of 0.05 in/min and otherwise in accordance with the manufacturer's operating instructions. Three coupons of each paste were tested and the results are shown in Table 3. The results of Table 3 show that the illustrative adhesive formulations can be cured to a strong thermoset using a fluorinated imide-phthalonitrile oligomer (Examples 5.1 and 8) and a blend of the fluorinated imide-phthalonitrile oligomer and a polyimide (Example 5.2).

Heat aging at 375° C. was also performed to determine the longevity of shear strength from 1 to 100 hours. The results are shown in Table 4. The results show that the Example 5.1 exhibited a significantly higher maximum load after 100 hours at 375° C. and an overall lower % adhesion loss as compared to both Comparative Examples 1 and 2.

TABLE 3

Lap-shear results.

| Example | Average Maximum Load (ksi) (n = 3) |
|---|---|
| Example 5.1 | 0.81 ± 0.20 |
| Example 8 | 0.47 ± 0.06 |
| Example 5.2 | 1.32 ± 0.17 |
| Comparative Example 1 | 1.71 ± 0.30 |
| Comparative Example 3 | 0.88 ± 0.03 |

TABLE 4

Aged Lap-shear results.

| | Average Maximum Load After Heat Aging at 375° C. (ksi) (n = 3)/% Adhesion Loss | | | |
|---|---|---|---|---|
| Example | Initial | 1 hr | 24 hrs | 100 hrs |
| Example 5.1 | 0.81 ± 0.20 | 0.60 ± 0.15/26 | 0.37 ± 0.08/54 | 0.25 ± 0.10/69 |
| Comparative Example 1 | 1.71 ± 0.30 | 1.24 ± 0.12/27 | 0.64 ± 0.09/62 | 0.18 ± 0.08/89 |
| Comparative Example 3 | 0.88 ± 0.03 | 0.64 ± 0.06/27 | 0.01 ± 0.02/99 | ~0/100 |

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. An adhesive formulation for forming a fluorinated poly(imide-phthalonitrile) thermoset polymer, the formulation comprising:

a fluorinated imide-phthalonitrile oligomer having Formula IV

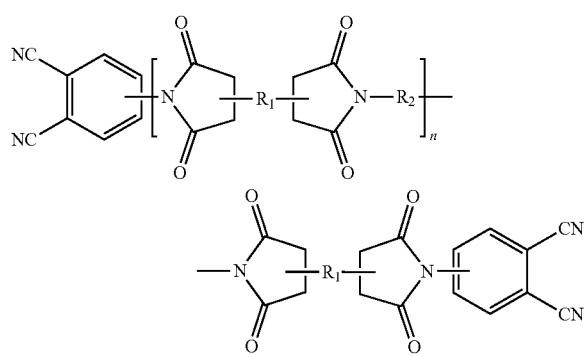

wherein $R_1$ is an unsubstituted or substituted aryl group and does not comprise an ether group; $R_2$ is an unsubstituted or substituted aryl group and does not comprise an ether group; at least one of $R_1$ and $R_2$ comprises a fluorine substituent; and n has a value of from 1 to 30.

2. The adhesive formulation of claim 1, wherein $R_1$ is an unsubstituted monocyclic group.

3. The adhesive formulation of claim 1, wherein $R_1$ is an unsubstituted polycyclic group comprising at least two unfused aromatic rings connected via a covalent bond.

4. The adhesive formulation of claim 1, wherein $R_1$ is a substituted polycyclic group comprising at least two unfused aromatic rings connected via a substituted alkyl group, the substituted alkyl group comprising the fluorine substituent.

5. The adhesive formulation of claim 1, wherein $R_2$ is an unsubstituted monocyclic group or a substituted monocyclic group comprising the fluorine substituent.

6. The adhesive formulation of claim 1, wherein $R_2$ is an unsubstituted polycyclic group comprising at least two unfused aromatic rings connected via an unsubstituted alkyl group.

7. The adhesive formulation of claim 1, wherein $R_2$ is a substituted polycyclic group comprising at least two unfused aromatic rings connected via sulfone group or via a substituted alkyl group, the substituted alkyl group comprising the fluorine substituent.

8. The adhesive formulation of claim 1, wherein $R_1$ comprises the fluorine substituent and $R_2$ does not comprise any fluorine substituent.

9. The adhesive formulation of claim 1, wherein n is from 6 to 13.

10. The adhesive formulation of claim 1, wherein the fluorinated imide-phthalonitrile oligomer has Formula IVA

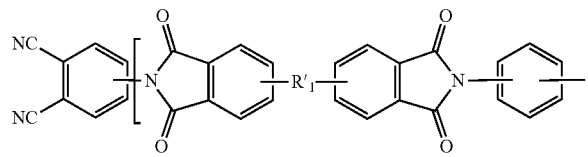 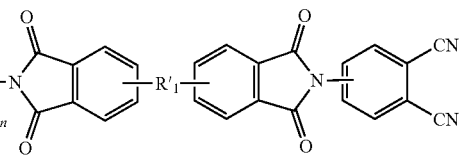

wherein $R_1'$ is a covalent bond or a substituted alkyl group and does not comprise an ether group; $R_2'$ is a sulfone group or an unsubstituted or substituted alkyl group and does not comprise an ether group; at least one of $R_1'$ and $R_2'$ comprises the fluorine substituent and n has the value of from 1 to 30.

11. The adhesive formulation of claim 10, wherein $R_1'$ is the substituted alkyl group comprising the fluorine substituent.

12. The adhesive formulation of claim 11, wherein $R_1'$ is hexafluoroisopropyl, 1,1,4,4-tetrakis(trifluoromethyl)cyclohexane in a form of a six-membered ring, 1,4-difluoro-1,4-bis(trifluoromethyl)cyclohexane in a form of a six-membered ring, or 2-phenyl-2-trifluoromethylpropane.

13. The adhesive formulation of claim 10, wherein $R_2'$ is the sulfone group.

14. The adhesive formulation of claim 10, wherein the fluorinated imide-phthalonitrile oligomer is

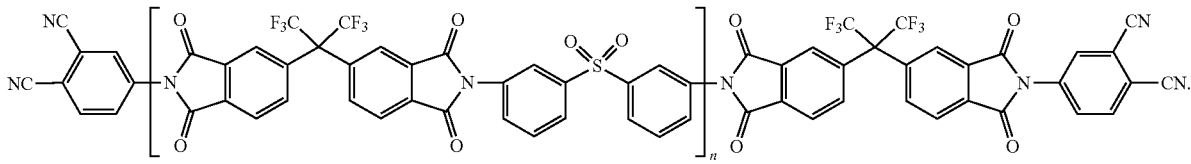

15. The adhesive formulation of claim 14, wherein n is from 6 to 13.

16. The adhesive formulation of claim 1, further comprising a catalyst, optionally, a liquid medium, and optionally, a filler.

17. The adhesive formulation of claim 1, further comprising a polyimide filler.

18. The adhesive formulation of claim 17, wherein the fluorinated imide-phthalonitrile oligomer is the reaction product of an aromatic dianhydride, an aromatic diamine, and an amine substituted 1,2-dicyanobenzene, and wherein the polyimide filler is a polyimide that is free of ether groups and is the reaction product of the aromatic dianhydride and the aromatic diamine.

19. A method of using the adhesive formulation of claim 1, the method comprising heating the adhesive formulation according to a curing profile to induce crosslinking reactions between phthalonitrile moieties of fluorinated imide-phthalonitrile oligomers having Formula IV to form a fluorinated poly(imide-phthalonitrile) thermoset polymer.

20. A fluorinated poly(imide-phthalonitrile) thermoset polymer formed by curing the adhesive formulation of claim 1, the polymer comprising crosslinked phthalonitrile moieties of fluorinated imide-phthalonitrile oligomers having Formula IV.

21. The fluorinated poly(imide-phthalonitrile) thermoset polymer of claim 20 having a degradation temperature of greater than 520° C., an average maximum load of from 300 psi to 6,000 psi, an adhesion loss of no more than 75% after exposure to a temperature of 375° C. in air for 100 hours, or combinations thereof.

22. An adhesive article comprising an aerospace structure and a layer of the adhesive formulation of claim 1 on a surface of the aerospace structure, optionally, wherein the layer is cured to form a fluorinated poly(imide-phthalonitrile) thermoset polymer comprising crosslinked phthalonitrile moieties of fluorinated imide-phthalonitrile oligomers having Formula IV.

23. A fluorinated imide-phthalonitrile oligomer having formula

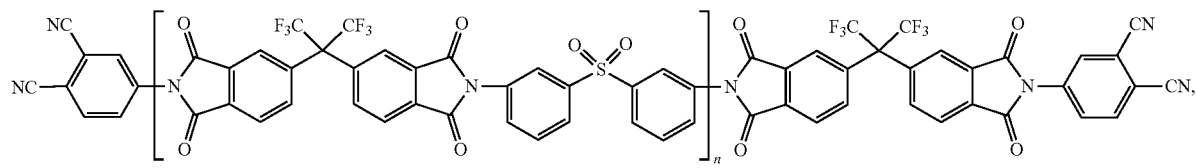

wherein n has a value of from 6 to 13.

* * * * *